(12) United States Patent
Okubo et al.

(10) Patent No.: US 10,799,940 B2
(45) Date of Patent: Oct. 13, 2020

(54) METHOD FOR PRODUCING FORGED CRANKSHAFT

(71) Applicant: NIPPON STEEL CORPORATION, Tokyo (JP)

(72) Inventors: Junichi Okubo, Tokyo (JP); Kenji Tamura, Tokyo (JP); Kunihiro Yoshida, Tokyo (JP); Samsoo Hwang, Tokyo (JP); Ryusuke Nakano, Tokyo (JP); Masao Hori, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/332,463

(22) PCT Filed: Aug. 24, 2017

(86) PCT No.: PCT/JP2017/030238
§ 371 (c)(1),
(2) Date: Mar. 12, 2019

(87) PCT Pub. No.: WO2018/100810
PCT Pub. Date: Jun. 7, 2018

(65) Prior Publication Data
US 2020/0290112 A1  Sep. 17, 2020

(30) Foreign Application Priority Data
Nov. 29, 2016 (JP) .................. 2016-231013

(51) Int. Cl.
*B21K 1/08* (2006.01)
(52) U.S. Cl.
CPC ..................... *B21K 1/08* (2013.01)

(58) Field of Classification Search
CPC ..... B21K 1/08; Y10T 29/17; Y10T 29/49286; Y10T 29/5116; Y10T 29/5133
See application file for complete search history.

(56) References Cited

U.S. PATENT DOCUMENTS 10,391,546 B2 * 8/2019 Okubo ...................... B21J 5/12
2018/0071814 A1  3/2018 Okubo et al.

FOREIGN PATENT DOCUMENTS

| JP | 2000094087 A | 4/2000 |
|---|---|---|
| JP | 2012161819 A | 8/2012 |

(Continued)

*Primary Examiner* — Jason L Vaughan
*Assistant Examiner* — Amanda Kreiling
(74) *Attorney, Agent, or Firm* — Greer Burns & Crain Ltd.

(57) ABSTRACT

A production method includes a preforming process, a forming process and a finish forging process. In the preforming process, an intermediate preform is formed from a billet. In the forming process, while each of a plurality of rough journals of the intermediate preform is held and pressed vertically by a pair of holding dies, rough pins are decentered in directions perpendicular to the pressing direction by the holding dies and an axial direction of the intermediate preform, and the intermediate preform is pressed in the axial direction of the intermediate preform. In the finish forging process, a final preform is placed such that the directions in which the rough pins are decentered are parallel to a horizontal direction, and the thus placed final preform is pressed vertically by a pair of pressing dies. The production method reduces the risk of occurrence of seams on a forged crankshaft.

16 Claims, 16 Drawing Sheets

(56) References Cited

FOREIGN PATENT DOCUMENTS

WO       2014038183 A1    3/2014
WO       2016152933 A1    9/2016

\* cited by examiner

Progression of Whole Process

METHOD FOR PRODUCING FORGED CRANKSHAFT

This is a National Phase Application filed under 35 U.S.C. § 371, of International Application No. PCT/JP2017/030238, filed Aug. 24, 2017, the contents of which are incorporated by reference.

TECHNICAL FIELD

The present invention relates to a method for producing a crankshaft, and more particularly to a method for producing a crankshaft by hot forging.

BACKGROUND ART

A crankshaft is essential in a reciprocating engine for an automobile, a motorcycle, an agricultural machine, a ship, or the like to transform reciprocating movement of a piston into rotational movement for deriving power. A crankshaft can be produced either by die forging or casting. When high strength and high rigidity are required for a crankshaft, a crankshaft produced by die forging (hereinafter referred to as a "forged crankshaft") is often used.

FIGS. 1A and 1B are schematic diagrams to illustrate an exemplary shape of a typical forged crankshaft. Among these figures, FIG. 1A is a general view, and FIG. 1B is a sectional view along a line IB-IB. To facilitate understanding of the shape of the crankshaft, FIG. 1B representatively shows one crankarm A7, a counterweight W7 that is integral with the crankarm A7, and a pin P4 and a journal J4 that are connected to the crankarm A7.

The crankshaft 11 shown in FIGS. 1A and 1B is a crankshaft of 4-cylinder 8-counterweight to be mounted on a 4-cylinder engine. The crankshaft 11 includes five journals J1 to J5, four pins P1 to P4, a front part Fr, a flange part Fl, and eight crankarms (hereinafter also referred to as "arms") A1 to A8. The arms A1 to A8 connect the journals J1 to J5 with the pins P1 to P4, respectively. Moreover, all the eight arms A1 to A8 integrally include counterweights (hereinafter, also referred to as "weights") W1 to W8, respectively. The front part Fr is located at a front end in the axial direction of the crankshaft 11, and the flange part Fl is located at a rear end thereof. The front part Fr is connected to the foremost first journal J1, and the flange part Fl is connected to the rearmost fifth journal J5.

Hereinafter, when the journals J1 to J5, the pins P1 to P4, the arms A1 to A8, and the weights W1 to W8 are collectively referred to, respectively, the following reference symbols are used: "J" for the journals; "P" for the pins; "A" for the arms; and "W" for the weights. Also, an arm A and a weight W that is integral with the arm A is collectively referred to as a "web".

The pin top PT which is the tip of the pin P4 is, as shown in FIG. 1B, the part of the pin P4 farthest from the center of the journal J4.

When producing a forged crankshaft having such a shape, in general, a billet is used as the starting material. A section perpendicular to the longitudinal direction of the billet, that is, a cross section thereof has a circular or rectangular shape. The area of the cross section is constant over the entire length of the billet. The term "cross section" as used herein means a section perpendicular to the longitudinal direction of a billet or preform, or the axial direction of a crankshaft. The term "longitudinal section" means a section in parallel with the longitudinal direction or the axial direction. Also, the area of a cross section is simply referred to as a "cross-sectional area". A forged crankshaft is produced by performing a preforming process, a die forging process, and a flash-trimming process in that order. Moreover, as required, a coining process is performed after the flash-trimming process. Typically, the preforming process includes a roll forming process and a bend forging process. The die forging process includes a rough forging process and a finish forging process.

FIGS. 2A to 2F are schematic diagrams to illustrate a conventional production process of a typical forged crankshaft. Among these figures, FIG. 2A shows a billet; FIG. 2B a rolled preform; FIG. 2C a bent preform; FIG. 2D a rough-forged product; FIG. 2E a finish-forged product; and FIG. 2F a forged crankshaft. It is noted that FIGS. 2A to 2F show a production process for producing the crankshaft 11 having the shape shown in FIGS. 1A and 1B.

Referring to FIGS. 2A to 2F, the production method of the forged crankshaft 11 will be described. First, a billet 12 having a predetermined length as shown in FIG. 2A is heated in a heating furnace and thereafter subjected to roll forming and bend forging in that order in the preforming process. In the roll forming, the billet 12 is rolled by use of, for example, a grooved roll, and thereby the billet 12 is reduced. Accordingly, the volume of the billet 12 is distributed in the axial direction, and a rolled preform 13 is obtained as an intermediate starting material (see FIG. 2B). Next, in the bend forging, the rolled preform 13 is partly pressed in a direction perpendicular to the axial direction. Thereby, the volume of the rolled preform 13 is distributed, and a bent preform 14 is obtained as a further intermediate starting material (see FIG. 2C).

Successively, in the rough forging process, the bent preform 14 is forged by use of a vertical pair of dies, and thereby, the bent preform 14 is formed into a rough-forged product 15 (see FIG. 2D). The resulting rough-forged product 15 has an approximate shape of the crankshaft (final product). Further, in the finish forging process, the rough-forged product 15 is forged by use of a vertical pair of dies, and thereby, the rough-forged product 15 is formed into a finish-forged product 16 (see FIG. 2E). The resulting finish-forged product 16 has a shape corresponding to that of the crankshaft as the final product. During the rough forging and finish forging, excess material flows out from between die parting surfaces of mutually opposed dies, and forms flash B. Therefore, each of the rough-forged product 15 and the finish-forged product 16 has pronounced flash B around its circumference.

In the flash-trimming process, for example, while the finish-forged product 16 having flash is held and sandwiched between a pair of dies, the flash B is punched off by use of a tool die. Thereby, the flash B is removed from the finish-forged product 16, and a flash-free forged product is obtained. The flash-free forged product has almost the same shape as that of the forged crankshaft 11 shown in FIG. 2F.

In the coining process, principal parts of the flash-free forged product are pressed slightly from above and from below with dies so that the flash-free forged product is reformed to have the same size and shape as those of the final product. Here, the principal parts of the flash-free forged product include, for example, shaft portions such as the journals J, the pins P, the front part Fr, and the flange part Fl, and further the arms A and the weights W. In this way, the forged crankshaft 11 is produced.

The production process shown in FIGS. 2A to 2F can be applied to various crankshafts without being limited to the 4-cylinder 8-counterweight crankshaft shown in FIGS. 1A and 1B. For example, it can be applied to a 4-cylinder 4-counterweight crankshaft.

In the case of a 4-cylinder 4-counterweight crankshaft, some of the eight arms A1 to A8 integrally include a weight W. For example, the foremost first arm A1, the rearmost eighth arm A8, and two arms at the center (the fourth and fifth arms A4 and A5) integrally include a weight W, respectively. The remaining arms, specifically, the second, third, sixth, and seventh arms (A2, A3, A6, and A7), do not include any weight, and have an elongated circular shape, respectively.

Besides, even for crankshafts to be mounted on a 3-cylinder engine, a series 6-cylinder engine, a V-type 6-cylinder engine, an 8-cylinder engine, and the like, the production process will be the same. Note that when adjustment of the layout angle of pins is required, a twisting process is added after the flash-trimming process.

Techniques concerning production of a forged crankshaft have been disclosed. For example, International Patent Application Publication No. WO2014/038183 (Patent Literature 1) discloses, in FIGS. 3 and 4, an apparatus including stationary journal dies for holding rough journals to be formed into journals, and pin dies for decentering rough pins to be formed into pins. In this apparatus, the stationary journal dies and the pin dies move in the same direction.

Japanese Patent Application Publication No. 2000-94087 (Patent Literature 2) discloses a method for producing a crankshaft by die forging including a rough forging process and a finish forging process. In this method, during the rough forging process, flash is not formed in the outer periphery of pins.

Japanese Patent Application Publication No. 2012-161819 (Patent Literature 3) discloses an apparatus including journal holding dies for holding parts to be formed into journals and pin holding dies for holding parts to be formed into pins. The pin holding dies include an axial slider and a radial slider. Accordingly, the pin holding dies are movable in the pressing direction by the dies and the axial direction of the starting material.

CITATION LIST

Patent Literature

Patent Literature 1: International Patent Application Publication No. WO2014/038183
Patent Literature 2: Japanese Patent Application Publication No. 2000-94087
Patent Literature 3: Japanese Patent Application Publication No. 2012-161819

SUMMARY OF INVENTION

Technical Problem

As mentioned above, in the finish forging process, a rough-forged product is forged by use of a vertical pair of dies. At the time, if the flash of the rough-forged product is located to face the dies, there is a possibility that the part where the flash is present will remain as a seam. Also, if the rough-forged product is not set in a pressing machine steadily at the time of finish forging, seams and other defects are likely to occur. In the circumstances, a new production method which can prevent occurrence of seams has been demanded.

An object of the present invention is to provide a forged crankshaft production method which can reduce the risk of occurrence of seams.

Solution to Problem

A production method of a forged crankshaft according to an embodiment of the present invention is a method for producing a forged crankshaft including: a plurality of journals defining an axis of rotation; a plurality of pins decentered with respect to the journals; and a plurality of crankarms that connect the journals with the pins, respectively, wherein at least one of the crankarms includes a counterweight. The production method comprises:

a preforming process for forming an intermediate preform from a billet, the intermediate preform including a plurality of rough journals to be formed into the plurality of journals, a plurality of rough pins to be formed into the plurality of pins, and a plurality of primary rough crankarms to be formed into the plurality of crankarms;

a forming process for forming a final preform by, while holding and vertically pressing each of the plurality of rough journals of the intermediate preform by a pair of holding dies, decentering the rough pins in directions perpendicular to the pressing direction by the holding dies and an axial direction of the intermediate preform and pressing the intermediate preform in the axial direction of the intermediate preform, the final preform including a plurality of secondary rough crankarms of which shapes are more similar to shapes of the crankarms than shapes of the primary rough crankarms are; and a finish forging process for forming a finish-forged product by placing the final preform such that the directions in which the rough pins are decentered are parallel to a horizontal direction and pressing the thus placed final preform vertically by a pair of pressing dies, the finish-forged product including the plurality of journals, the plurality of pins and the plurality of crankarms.

Advantageous Effects of Invention

The method for producing a forged crankshaft can reduce the risk of occurrence of seams.

DESCRIPTION OF EMBODIMENTS

Figure 1A:
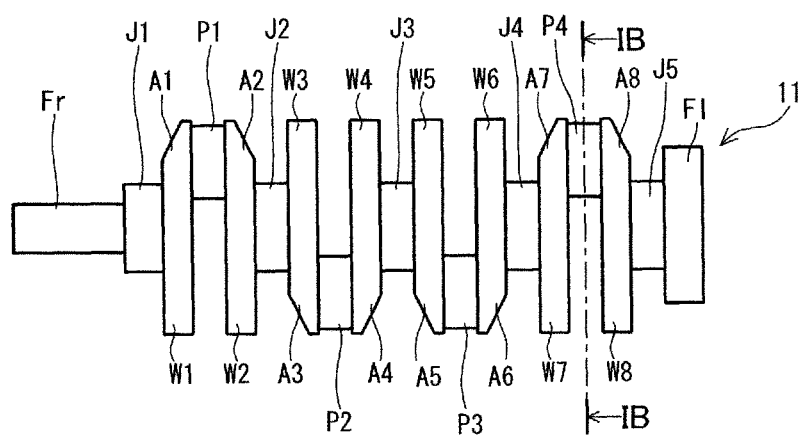
FIG. 1A is a schematic diagram to show an exemplary general shape of a typical forged crankshaft.

An embodiment of the present invention will hereinafter be described. In the following, examples are given to describe an embodiment of the present invention. However, the present invention is not limited to the examples which will be described below.

(Production Method of Forged Crankshaft)

A production method according to the present embodiment is a method for producing a forged crankshaft including a plurality of journals (journals J) which define an axis of rotation, a plurality of pins (pins P) decentered with respect to the journals J, and a plurality of crankarms (arms A) connecting the plurality of pins P and the plurality of journals J. At least one of the plurality of crankarms includes a counterweight W. The production method according to the present embodiment includes a preforming process, a forming process, and a finish forging process.

Examples of the forged crankshaft to be produced in the present embodiment include the above-described examples. All of the crankarms may include a counterweight W, and only some of the crankarms may include a counterweight W.

The preforming process is a process for forming an intermediate preform, which includes a plurality of rough journals to be formed into the plurality of journals J, a plurality of rough pins to be formed into the plurality of pins P, and a plurality of primary rough crankarms to be formed into the plurality of crankarms A, from a billet. The preforming process may include a plurality of steps. The preforming process is not particularly limited, and the preforming process may be a conventional process. For example, the preforming process described in the section of BACKGROUND ART may be used.

The forming process is a process for forming a final preform including secondary rough crankarms of which shapes are more similar to the shapes of the crankarms A (crankarms A of the forged crankshaft) than the shapes of the primary rough crankarms are. In the forming process, specifically, while each of the rough journals of the intermediate preform is held and pressed vertically by a pair of holding dies, the rough pins are decentered in directions perpendicular to the pressing direction by the holding dies and the axial direction of the intermediate preform, that is, horizontally, and the intermediate preform is pressed in the axial direction thereof. In the following paragraphs, the primary rough crankarms and the secondary rough crankarms are referred to as "primary rough arms" and "secondary rough arms", respectively, in some cases.

The holding dies include a pair of stationary holding dies which is not movable in the axial direction of the intermediate preform, and pairs of movable holding dies which are movable in the axial direction of the intermediate preform.

The pairs of movable holding dies move in the axial direction while holding the rough journals. For the forming process, pin decentering dies as well as the holding dies are used. The pin decentering dies are to decenter the rough pins and are movable in the pin decentering directions.

In the forming process, the rough pins of the intermediate preform may be decentered by an amount equal to the decentering amount of the pins of the forged crankshaft (final product). Alternatively, the rough pins of the intermediate preform may be decentered by an amount close to the decentering amount of the pins of the forged crankshaft (final product). In the latter case, the rough pins are decentered farther in a later process (for example, in the finish forging process).

The finish forging process is a process to form a finish-forged product including the plurality of journals J, the plurality of pins P and the plurality of crankarms A by placing the final preform such that the directions in which the rough pins are decentered are parallel to a horizontal direction and pressing the thus placed final preform vertically by a pair of pressing dies. Accordingly, the shapes of the journals, the pins and the crankarms of the finish-forged product are substantially the same as the shapes of those parts of the forged crankshaft (final product). The finish forging process may be included in a twisting process as needed. When a twisting process is performed after the finish forging process, the entire shape of the finish-forged product does not need to be the same as the entire shape of the forged crankshaft. When a twisting process is not performed, the shape of the finish-forged product, except for flash, may be substantially the same as the shape of the forged crankshaft.

As the pair of pressing dies, a pair of pressing dies which has engraved parts reflecting the shape of the finish-forged product is used. The finish forging process is not particularly limited, and the finish forging process may be a conventional process.

The flash of the finish-forged product can be removed in the flash-trimming process performed after the finish forging process. The flash-trimming process is not particularly limited, and the flash-trimming process may be a conventional process.

In the production method according to the present embodiment, a coining process may be performed later than the finish forging process (for example, after the flash-trimming process) as needed. When adjustment of the layout angle of pins is required, a twisting process may be performed later than the finish forging process (for example, after the flash-trimming process). All the processes described above, namely, the preforming process, the forming process, and the finish forging process, and the twisting process when necessary, are performed as a series of hot working.

In the production method according to the present embodiment, in the forming process, excess material may be caused to flow out along the horizontally extended die parting surfaces between each pair of holding dies so that the final preform will have flash. In the production method according to the present embodiment, the forming process and the finish forging process are performed while the intermediate preform or the finish preform is held such that the decentering directions of the rough pins are parallel to the horizontal direction. Therefore, even if the forming process is performed in a manner to form flash, it is possible to control occurrence of a seam in each part between a journal or pin and a crankarm, that is, in each part where there is a difference in volume.

In the forming process, flash may be formed in at least one place selected from among a rough front part, which is to be formed into the front part Fr of the forged crankshaft, a rough flange part, which is to be formed into the flange part Fl of the forged crankshaft, and the rough pins.

In the forming process, the pressing of the intermediate preform in the axial direction may be completed after the completion of the decentering of the rough pins. This arrangement permits control of volume transfer from the respective counterweights toward the pins through the crankarms, and accordingly, a sufficient volume is easily assured for each of the counterweights.

In the forming process, the pressing of the intermediate preform in the axial direction may be completed before the completion of the decentering of the rough pins. This arrangement permits the final product to have pin shoulder portions having more similar shapes to those portions of the finish-forged product. This allows the final preform to be set more steadily in the pressing dies for the finish forging process.

In the forming process, the pressing of the intermediate preform in the axial direction may be completed at the same time as the completion of decentering of the rough pins. This arrangement permits control of volume transfer from the respective counterweights toward the pins through the crankarms, and accordingly, a sufficient volume is easily assured for each of the counterweights. Also, it takes only a short time for the forming process, and accordingly, the forged crankshaft production efficiency is improved.

In the forming process, the pressing of the intermediate preform in the axial direction may be performed by use of a hydraulic cylinder. The use of a hydraulic cylinder facilitates independent control of the axial pressing of the intermediate preform from the decentering of the rough pins.

The decentering of the rough pins in the forming process may be performed by use of a wedge mechanism. For example, the decentering of the rough pins in the forming process may be performed by use of wedges fixed on a bolster base. The decentering of the rough pins can be performed by use of pin decentering dies which can be moved by the wedge mechanism. The details of the pin decentering dies will be described later.

The production method of the forged crankshaft according to the present embodiment will hereinafter be described in reference to the drawings.

1. Exemplary Production Process

Figure 1B:
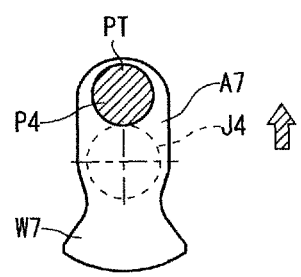
FIG. 1B is a sectional view of the crankshaft along the line IB-IB in FIG. 1A.
Figure 2A:
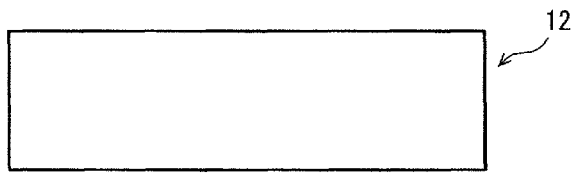
FIG. 2A is a schematic diagram to show a billet in a conventional production process.
Figure 2B:
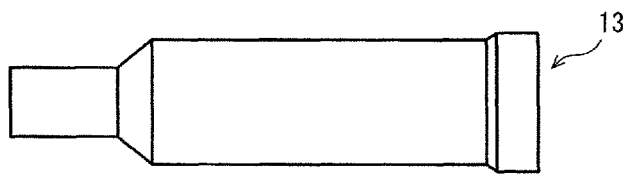
FIG. 2B is a schematic diagram to show a rolled preform in the conventional production process.
Figure 2C:
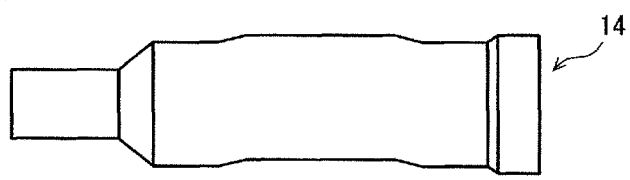
FIG. 2C is a schematic diagram to show a bent preform in the conventional production process.
Figure 2D:
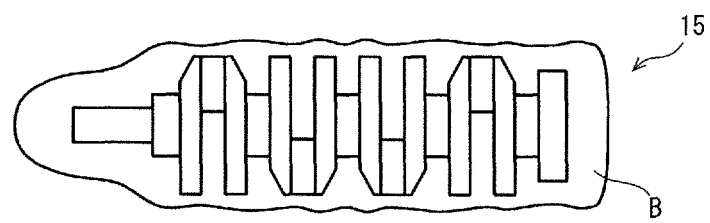
FIG. 2D is a schematic diagram to show a rough-forged product in the conventional production process.
Figure 2E:
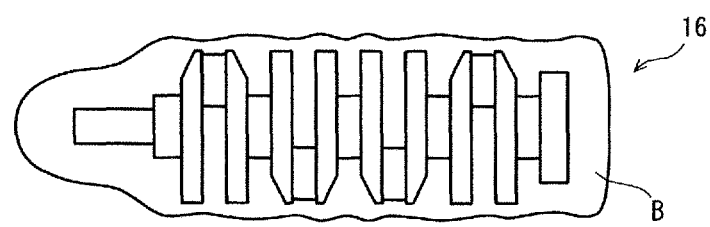
FIG. 2E is a schematic diagram to show a finish-forged product in the conventional production process.
Figure 2F:
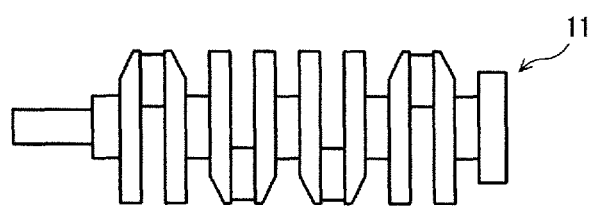
FIG. 2F is a schematic diagram to show a forged crankshaft in the conventional production process.

A forged crankshaft to be produced by the production method of the present embodiment includes a plurality of journals J that define an axis of rotation, a plurality of pins P that are decentered with respect to the journals J, and a plurality of arms A (crankarms) that connect the journals J with the pins P. At least one of the arms A includes a weight W (counterweight). In an exemplary production process of the present embodiment, a 4-cylinder 8-counterweight crankshaft as shown in FIGS. 1A and 1B is produced. In another exemplary production process, a 4-cylinder 4-counterweight crankshaft as described above is produced.

FIGS. 3A to 3F are diagrams to show an exemplary production process of the present embodiment for forming a forged crankshaft. In the exemplary production process shown in FIGS. 3A to 3F, a crankshaft having the shape shown in FIG. 1 is produced. FIGS. 3A, 3B, 3C, 3D, 3E and 3F show a billet, an initial preform, an intermediate preform, a final preform, a finish-forged product, and a forged crankshaft (final product), respectively.

Figure 3A:
FIG. 3A is a schematic diagram to show an exemplary billet used in a production method according to an embodiment of the present invention.
Figure 3B:
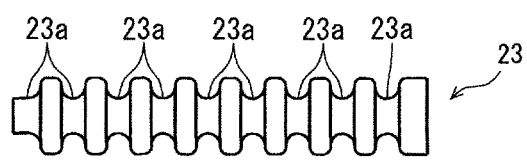
FIG. 3B is a schematic diagram to show an exemplary initial preform produced in the production method according to the embodiment.

First, a billet 22 is used as a workpiece, and the cross-sectional area thereof is reduced in regions to be formed into pins (hereinafter referred to as "pin-corresponding parts") and in regions to be formed into journals (hereinafter referred to as "journal-corresponding parts"). Thereby, a plurality of parts 23a with a smaller cross-sectional area are formed in the billet 22. As a result, an initial preform 23 as shown in FIG. 3B is obtained. In this process, for example, reduce rolls or cross rolls may be used.

Next, in order to further distribute the volume, the initial preform 23 is pressed by a pair of pressing dies and thereby formed into an intermediate perform 24. This pressing method is not particularly limited, and any conventional method can be used. The intermediate preform 24 includes rough journals 24j to be formed into journals J, rough pins 24p to be formed into pins P, primary rough arms (primary rough crankarms) 24a to be formed into arms A, a rough front part 24fr to be formed into a front part Fr, and a rough flange part 24fl to be formed into a flange part Fl.

Figure 3C:
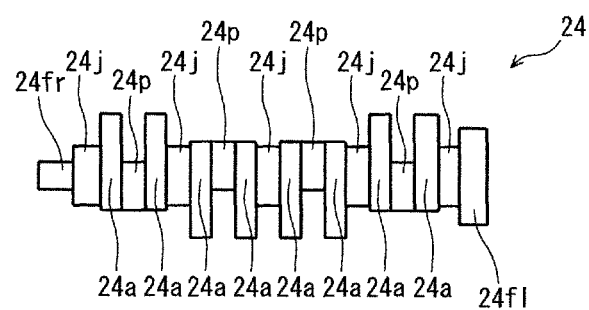
FIG. 3C is a schematic diagram to show an exemplary intermediate preform produced in the production method according to the embodiment.

The process to form the intermediate preform 24 from the billet 22 is a preliminary forming process. The process shown in FIGS. 3B and 3C is an example, and it is possible to form an intermediate preform through another process. The details of the preliminary forming process will be described later.

Figure 3D:
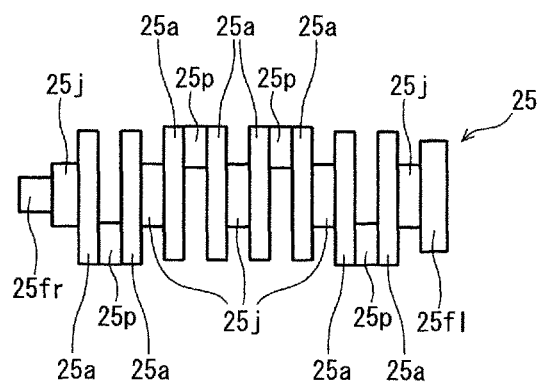
FIG. 3D is a schematic diagram to show an exemplary final preform produced in the production method according to the embodiment.

Next, a forming process is performed. In the forming process, a final preform 25 is formed from the intermediate preform 24. As shown in FIG. 3D, the final preform 25 includes secondary rough arms (secondary rough crankarms) 25a of which shapes are more similar to the arms A than the shapes of the primary rough arms 24a are. The final preform 25 includes rough pins 25p, rough journals 25j, a rough front part 25fr, and a rough flange part 25fl. The details of the forming process will be described later.

Figure 3E:
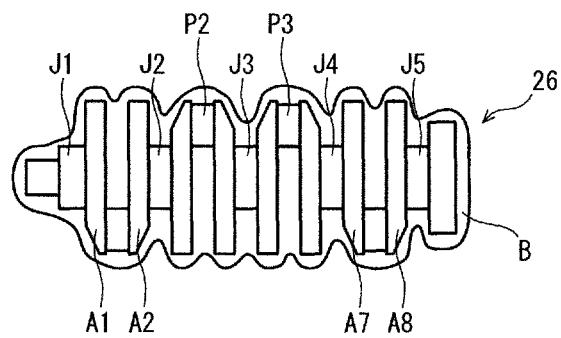
FIG. 3E is a schematic diagram to show an exemplary finish-forged product produced in the production method of the present embodiment.

In the finish forging process, die forging is performed as in a conventional finish forging process. In the finish forging process, a finish-forged product 26 is formed from the final preform 25. As shown in FIG. 3E, the finish-forged product 26 includes a plurality of journals J, a plurality of pins P, and a plurality of arms A. (In FIG. 3E, the reference symbols are partly omitted.) FIG. 3E shows an example in which flash B is formed in the finish forging process. The details of the finish forging process will be described later.

Figure 3F:
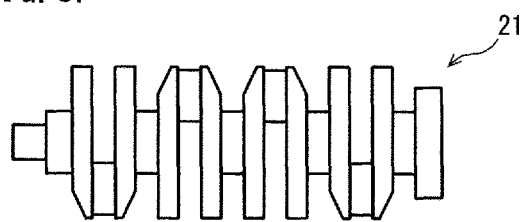
FIG. 3F is a schematic diagram to show an exemplary forged crankshaft produced in the production method of the present embodiment.

In the flash-trimming process, for example, while the finish-forged product 26, which has flash B, is pinched and held between a pair of dies, the flash B is punched out by a cutting die, and thereby, the flash B is removed from the finish-forged product 26. As a result, a forged crankshaft 21 (final product) as shown in FIG. 3F is produced. Since the names of the respective parts of the forged crankshaft 21 have been already mentioned in reference to FIGS. 1A and 1B, a description thereof is omitted here.

2. Exemplary Preforming Process

Figure 4A:
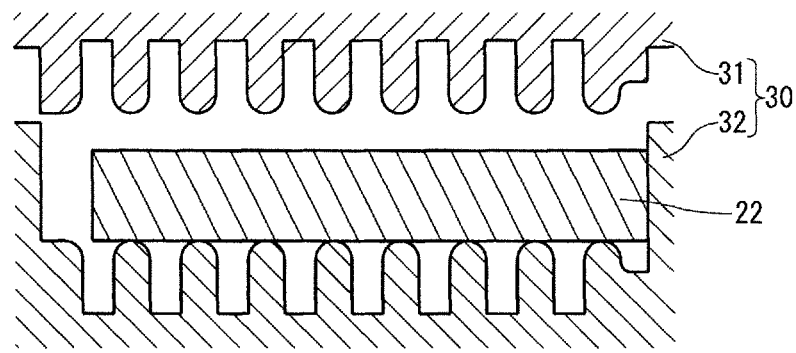
FIG. 4A is a vertical sectional view to schematically show a state before pressing in an exemplary first step of the preforming process.
Figure 4B:
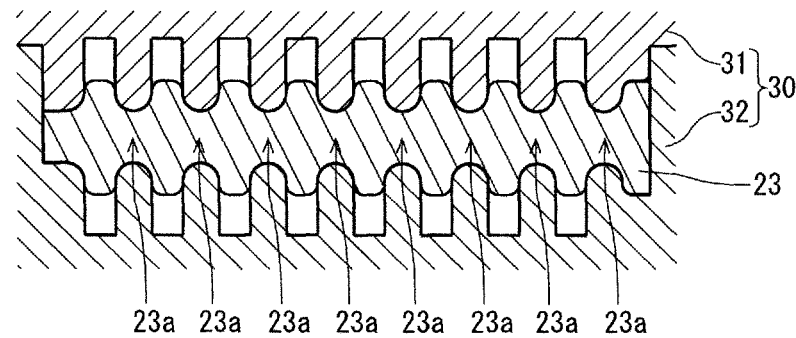
FIG. 4B is a vertical sectional view to schematically show a state at the completion of the pressing in the exemplary first step of the preforming process.
Figure 5A:
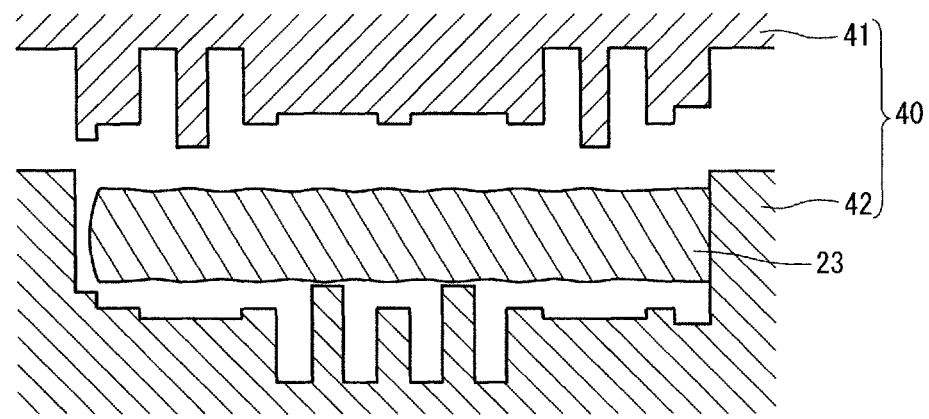
FIG. 5A is a vertical sectional view to schematically show a state at the start of pressing in an exemplary second step of the preforming process.
Figure 5B:
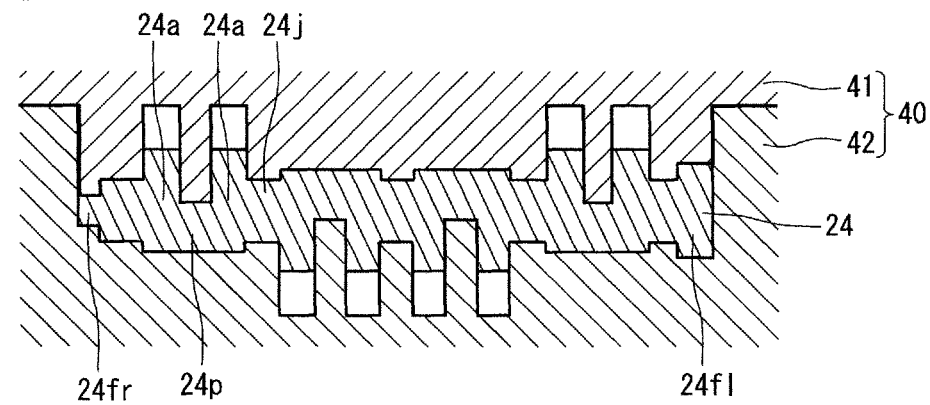
FIG. 5B is a vertical sectional view to schematically show a state at the completion of the pressing in the exemplary second step of the preforming process.

FIGS. 4A to 5B are diagrams to show an exemplary preforming process. FIGS. 4A and 4B show a step of forming the initial preform 23 shown in FIG. 3B. FIGS. 5A and 5B show a step of forming the intermediate preform 24 shown in FIG. 3C.

FIG. 4A shows the billet 22 having a circular cross section, and a vertical pair of pressing dies 30. The pressing dies 30 include an upper die 31 and a lower die 32. The upper die 31 and the lower die 32 have shapes that permit the billet 22 to be formed into the initial preform 23.

First, as shown in FIG. 4A, the billet 22 is placed between the upper die 31 and the lower die 32. In this state, the upper die 31 is moved down to press the billet 22. Thereby, the cross-sectional area of the billet 22 is decreased in the pin-corresponding parts and the journal-corresponding parts, so that the parts 23a with a smaller cross-sectional area are formed. In this way, the initial preform 23 is obtained. In the initial preform 23, the cross sections of the pin-corresponding parts and the journal-corresponding parts are elliptical. The long axes of these ellipses extend in the direction perpendicular to the paper surface of FIG. 4B.

Next, as shown in FIGS. 5A and 5B, the initial preform 23 is pressed by a vertical pair of pressing dies 40. The pressing dies 40 include an upper die 41 and a lower die 42. The upper die 41 and the lower die 42 have shapes that permit the initial preform 23 to be formed into the intermediate preform 24.

First, as shown in FIG. 5A, the initial preform 23 is placed between the upper die 41 and the lower die 43. In this regard, the initial preform 23 is placed such that the long axes of the elliptical cross sections of the pin-corresponding pars and the journal-corresponding parts are parallel to the vertical direction (pressing direction). Accordingly, the long axes of the elliptical cross sections of the pin-corresponding parts and the journal-corresponding parts are arranged in parallel to the vertical direction on the paper surface of FIG. 5A. In other words, the initial preform 23, which was formed by the pressing dies 30, is placed in the pressing dies 40 after being rotated by 90 degrees around its own axis.

Next, the upper die 41 is moved down to press the initial preform 23 to form the intermediate preform 24 therefrom. The intermediate preform 24 includes rough journals 24j to be formed into the journals J, rough pins 24p to be formed into the pins P, primary rough arms (primary rough crankarms) 24a to be formed into the arms A, a rough front part 24fr to be formed into the front part Fr, and a rough flange part 24fl to be formed into the flange part Fl (see FIG. 3C). The rough pins 24p are slightly decentered with respect to the rough journals 24j in the decentering directions of the pins P. The length (the longitudinal dimension along the axis) of the intermediate preform 24 is greater than the length (the longitudinal dimension along the axis) of the final product, i.e., the forged crankshaft.

3. Exemplary Forming Process

Figure 6A:
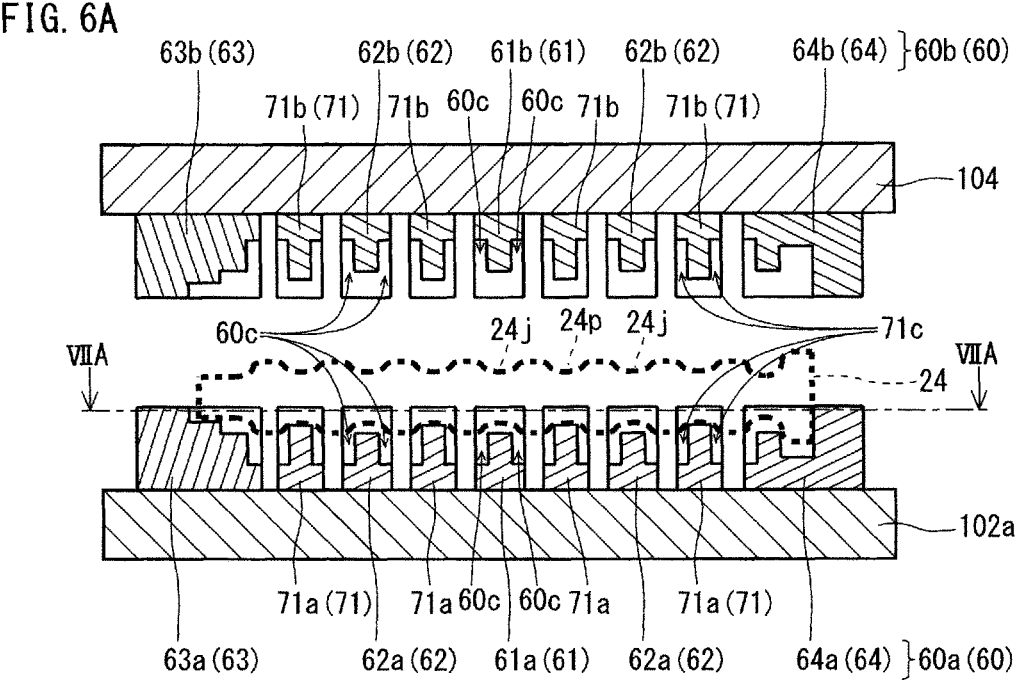
FIG. 6A is a vertical sectional view to schematically show a state before the start of an exemplary forming process.
Figure 6B:
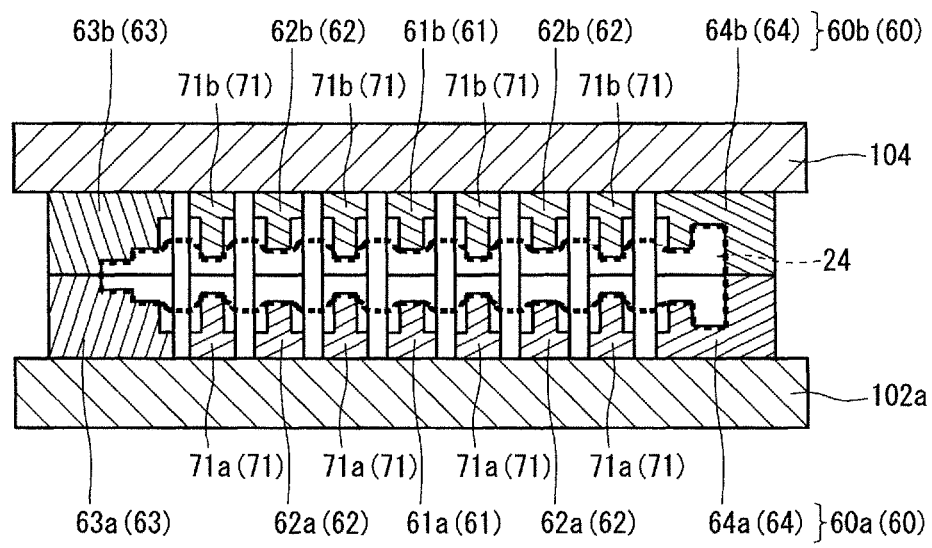
FIG. 6B is a vertical sectional view to schematically show a state in the middle of the exemplary forming process.
Figure 6C:
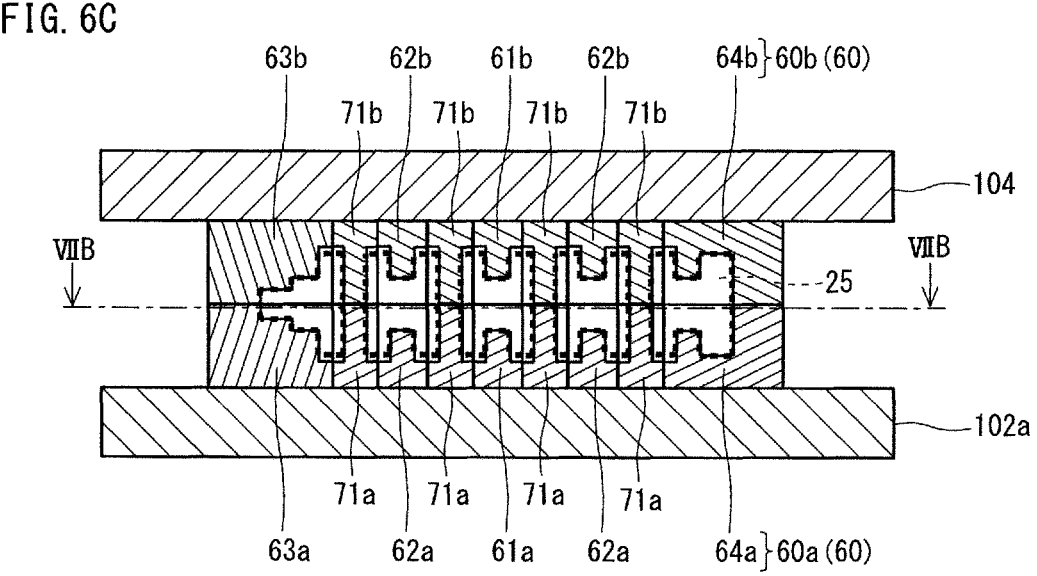
FIG. 6C is a vertical sectional view to schematically show a state at the completion of the exemplary forming process.
Figure 7A:
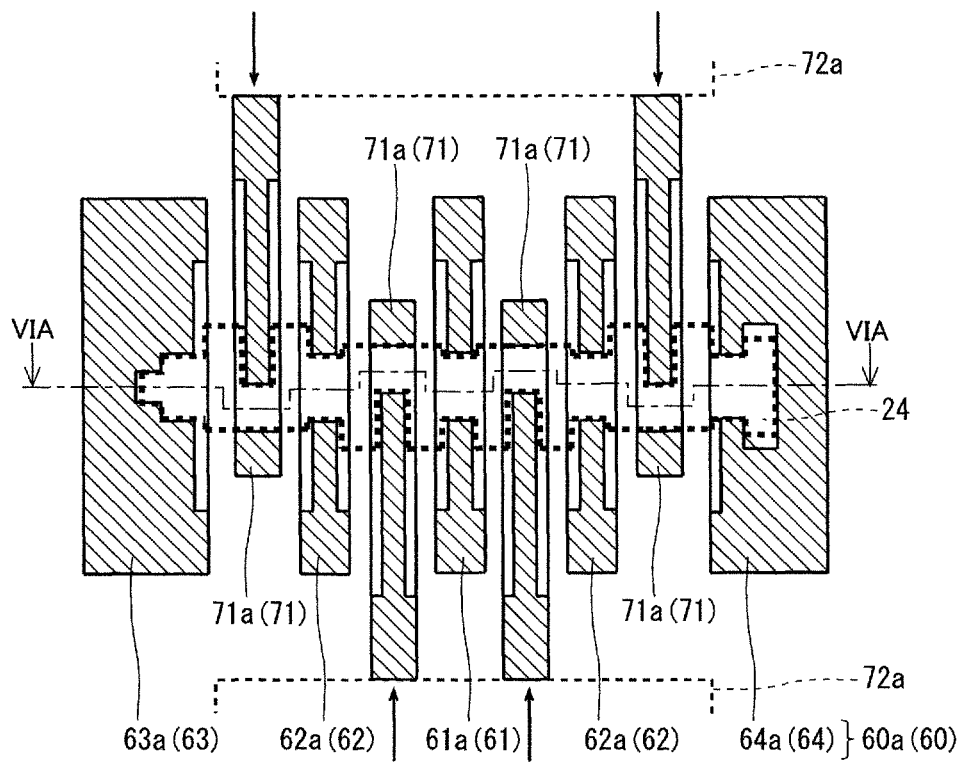
FIG. 7A is a horizontal sectional view to schematically show the state before the start of the exemplary forming process.
Figure 7B:
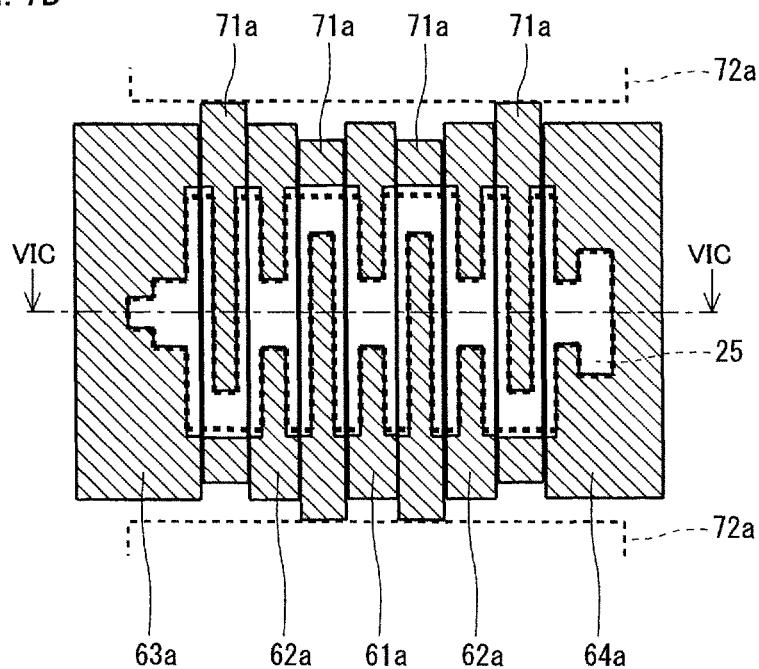
FIG. 7B is a horizontal sectional view to schematically show the state at the completion of the exemplary forming process.

FIGS. 6A to 6C, 7A and 7B are diagrams to show an exemplary forming process. FIGS. 6A and 7A show the state before the start of the forming process, and FIG. 6B shows the state in the middle of the forming process. FIGS. 6C and 7B show the state at the completion of the forming process. FIGS. 6A and 6B are vertical longitudinal sectional views along the line VIA-VIA in FIG. 7A. Specifically, FIGS. 6A and 6B show a vertical longitudinal section along a center line of the intermediate preform 24. FIG. 6C is a vertical longitudinal sectional view along the line VIC-VIC in FIG. 7B. FIG. 7A is a horizontal sectional view along the line VIIA-VIIA in FIG. 6A. FIG. 7B is a horizontal sectional view along the line VIIB-VIIB in FIG. 6C. More specifically, FIGS. 7A and 7B show a horizontal section at a level slightly lower than the die-parting plane of holding dies 60. To facilitate understanding, in FIGS. 6A to 6C, 7A and 7B, the outline of the intermediate preform 24 and the outline of the final preform 25 are shown by thick dotted line. In FIGS. 7A and 7B, further, the outline of a wedge receiver 72a, which will be described later, is partly shown by thin dotted line.

As shown in FIG. 6A, in the forming process, pin decentering dies 71 as well as the holding dies 60 are used. The holding dies 60 include stationary holding dies 61, movable holding dies 62, front-side holding dies 63 and flange-side holding dies 64. The mechanism for moving these dies will be described later. These dies include upper dies and lower dies. In other words, the holding dies 60 include a plurality of pairs of holding dies, each pair composed of a lower holding die 60a and an upper holding die 60b. Specifically, the pair of stationary holding dies 61 includes a lower stationary holding die 61a and an upper stationary holding die 61b. Each pair of movable holding dies 62 includes a lower movable holding die 62a and an upper movable holding die 62b. The pair of front-side holding dies 63 includes a lower front-side holding die 63a and an upper front-side holding die 63b. The pair of flange-side holding dies 64 includes a lower flange-side holding die 64a and an upper flange-side holding die 64b. Each pair of pin decentering dies 71 includes a lower pin decentering die 71a and an upper pin decentering die 71b.

The lower dies are placed on a bolster base 102a, which will be described later. The upper dies are supported by a die cushion base 104, which will be described later, and the upper dies move vertically with a movement of the die cushion base 104.

The holding dies 60 are to hold the rough journals 24j. Among the holding dies 60, the stationary holding dies 61 do not move in the axial direction of the intermediate preform 24. On the other hand, the movable dies 62, the front-side holding dies 63 and the flange-side holding dies 64 are movable in the axial direction of the intermediate preform 24. The pin decentering dies 71 are to decenter the rough pins 24p, and the pin decentering dies 71 are movable in directions perpendicular to the pressing direction by the holding dies 60 and the axial direction of the preform 24. The respective holding dies 60 and pin decentering dies 71 have recesses 60c and 71c to form spaces for forming and holding the primary rough arms (see FIG. 6A).

First, as shown in FIGS. 6A and 7A, the intermediate preform 24 is placed on the lower dies. In this regard, the intermediate preform 24 is placed such that the directions in which the rough pins 24p are to be decentered are perpendicular to the pressing direction by the holding dies 60 and the axial direction of the intermediate preform 24. At the stage before the start of the forming process, the respective dies are arranged at intervals in the axial direction of the preform.

Next, the upper dies are moved down with a downward movement of the die cushion base 104, and the rough journals 24j are pressed vertically and held by the pairs of holding dies 60. As shown in FIG. 6B, the rough journals 24j are locked in the respective pairs of holding dies 60. The rough journal 24j held by the pair of stationary holding dies 61 is not horizontally movable.

Next, while the rough journals 24j are held, the rough pins 24p are decentered, and the preform 24 is pressed in the axial direction thereof. Thereby, as shown in FIGS. 6C and 7B, the final preform 25 is obtained. In the following paragraphs, the process of decentering the rough pins 24p will be referred to pin decentering, and the process of pressing the intermediate preform 24 in the axial direction will be referred to as axial pressing.

The pin decentering is performed by moving the pin decentering dies 71 in directions which are perpendicular to the pressing direction by the holding dies 60 (that is, in horizontal directions) and perpendicular to the axial direction of the intermediate preform 24. In an exemplary process according to the present embodiment, the moving direction of the two pairs of pin decentering dies 71 at both ends is opposite to the moving direction of the two pairs of pin decentering dies 71 in the center (see arrows in FIG. 7A). As shown in FIG. 7B, the pin decentering dies 71a are pushed and moved by the wedge receiver 72a. Similarly, as shown in FIG. 6C, the upper pin decentering dies 71b are pushed and moved by a wedge receiver 72b, which will be described later, in the same direction as the pin decentering dies 71a.

Figure 8A:
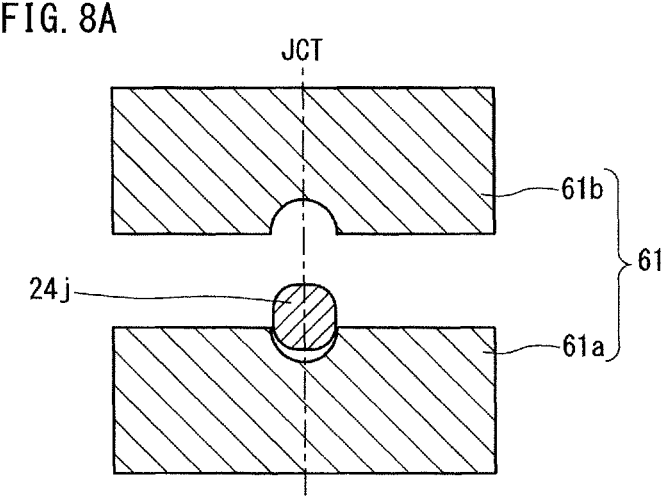
FIG. 8A is a schematic view to show a pair of stationary holding dies and a rough journal therein in the state before the start of the exemplary forming process.
Figure 8B:
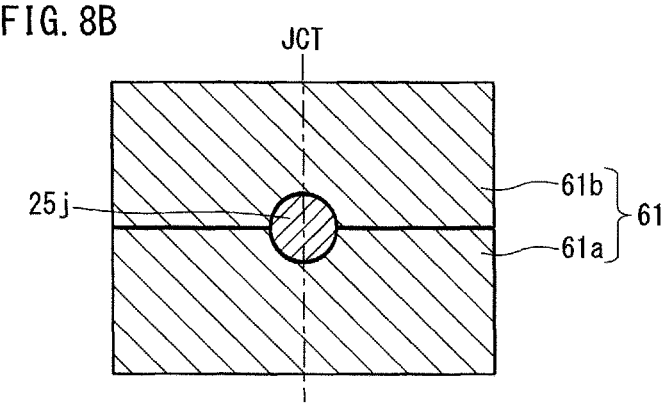
FIG. 8B is a schematic view to show the pair of stationary holding dies and the rough journal therein in the state at the completion of the exemplary forming process.

FIG. 8A schematically shows a cross section of the pair of stationary holding dies 61 and the rough journal 24j therein in the state before the start of the forming process (in the state shown in FIGS. 6A and 7A). FIG. 8B schematically shows a cross section of the pair of stationary holding dies 61 and the rough journal 25j therein in the state at the completion of the forming process (in the state shown in FIGS. 6C and 7B). These figures are sectional views on a plane perpendicular to the axial direction of the preform, and in these figures, the pair of stationary holding dies 61 is shown only partly. In order to facilitate understanding, in FIGS. 8A and 8B, a rough journal center line JCT which is a vertical line passing the center of the rough journal 24j or 25j is shown. Similarly, in FIGS. 9A, 9B, 10A and 10B, which will be described later, the rough journal center line JCT is shown. The positions of the rough journal center line JCT shown in FIGS. 9A to 10B are merely examples to facilitate understanding.

Figure 9A:
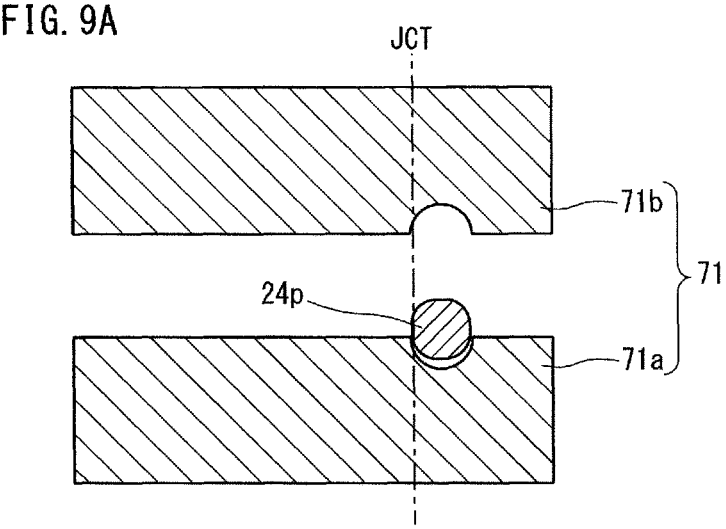
FIG. 9A is a schematic view to show a rough pin and a pair of pin decentering dies therearound in the state before the start of the exemplary forming process.
Figure 9B:
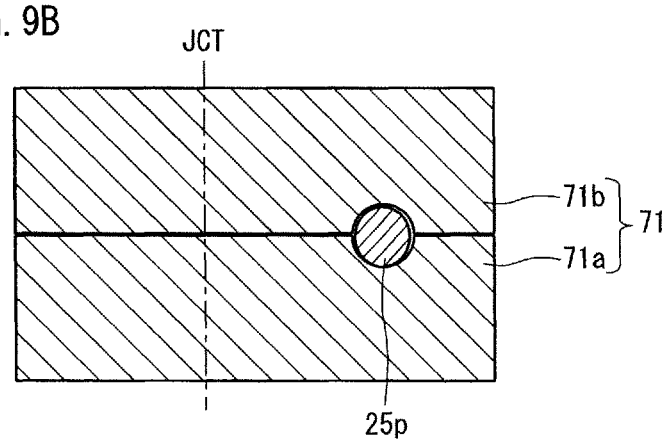
FIG. 9B is a schematic view to show the rough pin and the pair of pin decentering dies therearound in the state at the completion of the exemplary forming process.

FIG. 9A schematically shows a cross section of one of the rough pins 24p and the pair of pin decentering dies 71 therearound in the state before the start of the forming process (in the state shown in FIGS. 6A and 7A). FIG. 9B schematically shows a cross section of the rough pin 25p and the pair of pin decentering dies 71 therearound in the state at the completion of the forming process (in the state shown in FIGS. 6C and 7B). These figures are sectional views on a plane perpendicular to the axial direction of the intermediate preform. As is clear from the positions of the rough journal center line JCT shown in FIGS. 9A and 9B, the rough pin 25p shown in FIG. 9B is decentered. As shown in FIG. 9A, each pair of pin decentering dies 71 has a space for the rough pins 24p.

Figure 10A:
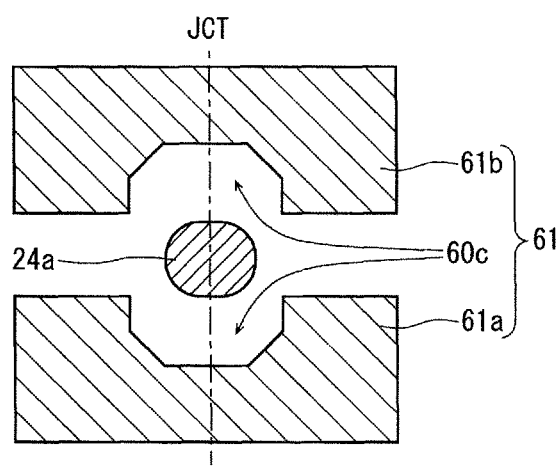
FIG. 10A is a schematic view to show the pair of stationary holding dies and a primary rough arm adjacent thereto in the state before the start of the exemplary forming process.
Figure 10B:
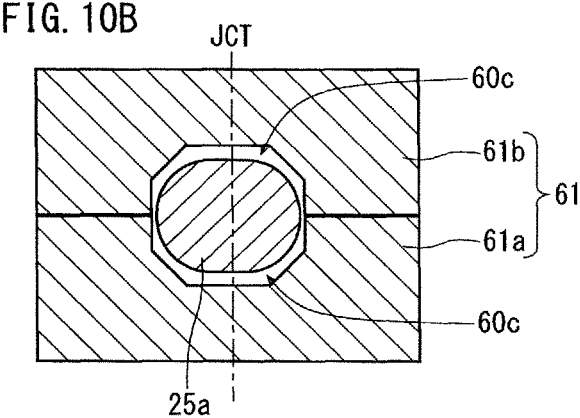
FIG. 10B is a schematic view to show the pair of stationary holding dies and a secondary rough arm adjacent thereto in the state at the completion of the exemplary forming process.

FIG. 10A schematically shows a cross section of the primary pair of stationary holding dies 61 and one of the rough arms 24a adjacent thereto in the state before the start of the forming process (in the state shown in FIGS. 6A and 7A). FIG. 10B schematically shows a cross section of the pair of stationary holding dies 61 and the secondary rough arm 25a adjacent thereto in the state at the completion of the forming process (in the state shown in FIGS. 6C and 7B). These figures are sectional views on a plane perpendicular to the axial direction of the intermediate preform 24, and these figures show a section at a space made in the stationary holding dies 61 for the rough arm, that is, a space made by recesses 60c. As shown in FIG. 10A, the pairs of holding dies 60 have spaces for the primary rough arms 24a. As the axial pressing is progressing, the material moves into the spaces, and thereby, the secondary rough arms 25a, which have shapes more similar to the shapes of the arms A than the shapes of the primary rough arms 24a, are formed. As shown in FIGS. 10A and 10B, the cross-sectional areas of the secondary rough arms 25a are greater than the cross-sectional areas of the primary rough arms 24a.

In reference to FIG. 6A, the axial pressing is performed by causing the pair of front-side holding dies 63 and the pair of flange-side holding dies 64 to come closer to each other. In this regard, the pair of front-side holding dies 63 and the pair of flange-side holding dies 64 are moved in the axial direction of the preform 24.

The forming process may be performed to form flash on the final preform 25. In the production method according to the present embodiment, as will be described later, the direction of placement of the final preform 25 for the finish forging process is the same as the direction of placement of the intermediate preform 24 for the forming process, which includes the pin decentering. Specifically, both in the pin decentering process and in the finish forging process, the preform 24 or 25 is placed such that the decentering directions of the rough pins 24p or 25p are in directions parallel to the horizontal direction. Accordingly, even when flash is formed in the forming process to protrude from the horizontally extended die parting surfaces (from between the opposed surfaces of the lower and upper dies) of the respective pairs of holding dies 60, the flash will never cause seams in the finish forging process.

On the other hand, in a conventional production method in which the direction of placement of a preform for a pin decentering process and the direction of placement of a preform for a finish forging process are different by 90 degrees, when flash is formed in the forming process to protrude from the die parting surfaces, the flash is likely to cause seams on the final product. This is because, in the production method in which the placement of a preform is different by 90 degrees between in the pin decentering process and in the finish forging process, the flash which is formed in the pin decentering process to protrude from the die parting surfaces is positioned to face the pressing dies for the next finish forging process.

Figure 11:
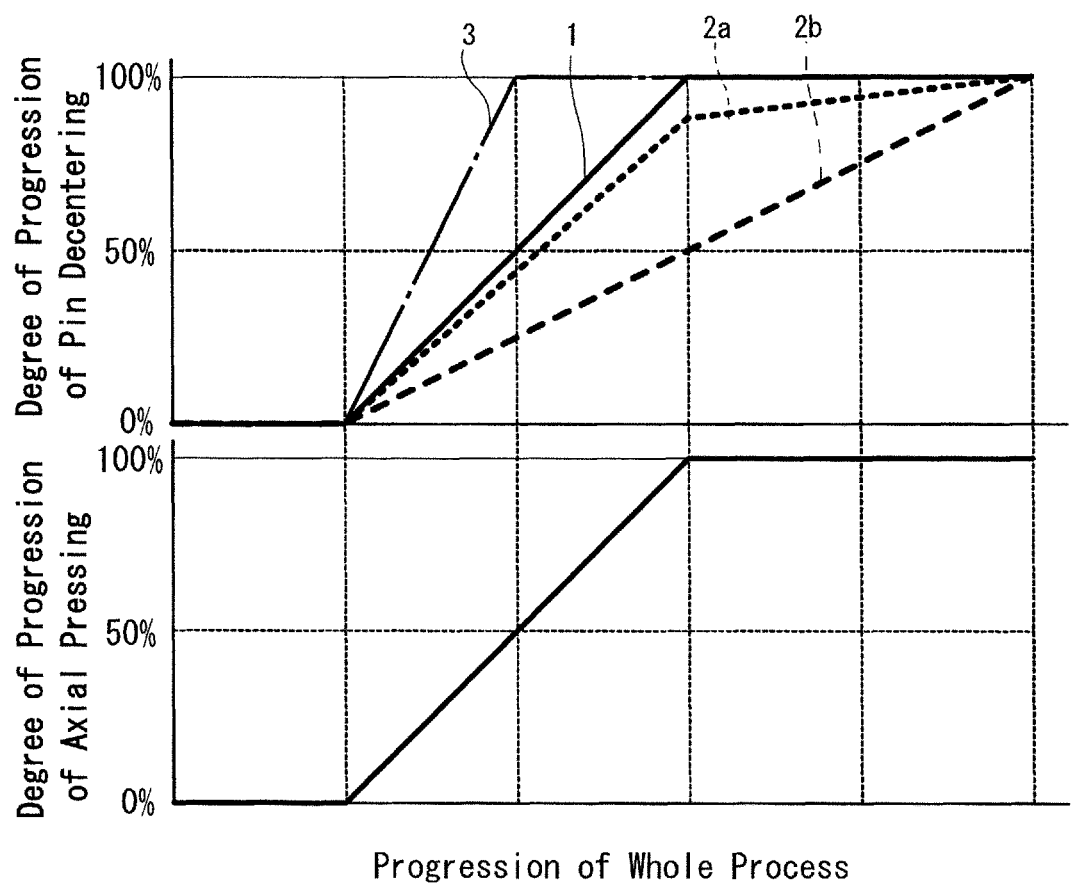
FIG. 11 is a graph to show the relationship between axial pressing and pin decentering in the forming process.

In reference to FIG. 11, the timing of performing the pin decentering and the axial pressing is described. In FIG. 11, the horizontal axis indicates progression (time course) of the whole process, and the vertical axis indicates degree of progression of each process. The degree of progression of the pin decentering means the rate of the actual movement distance of the rough pins when the final movement distance of the rough pins to be attained by the pin decentering is considered as 100%. The degree of progression of the axial pressing means the rate of the actual reduction of the intermediate preform in the axial dimension when the final reduction of the intermediate preform in the axial direction (the final decrease in the axial dimension of the intermediate preform) to be attained by the axial pressing is considered as 100%.

The solid line 1 in FIG. 11 shows a case in which the axial pressing is completed at the same time as the completion of the pin decentering. The dotted lines 2a and 2b in FIG. 11 show cases in which the axial pressing is completed before the completion of the pin decentering. The dot-and-dash line 3 in FIG. 11 shows a case in which the axial pressing is completed after the completion of the pin decentering.

In a conventional method in which pin decentering dies and holding dies are both moved vertically, the movements of the pin decentering dies may apply force to open the holding dies. Accordingly, there is a risk that the material may flow out along the journal die parting surfaces and the like. In the conventional production method, therefore, in order to reduce the risk of the flow-out of the material, it is important to complete the axial pressing before the completion of the pin decentering. In the production method according to the present embodiment, on the other hand, the moving directions of the pin decentering dies 71 are parallel to the horizontal direction, and are perpendicular to the pressing direction by the holding dies 60 (vertical direction) and the axial direction of the intermediate preform 24. Accordingly, the movements of the pin decentering dies are unlikely to apply force to open the holding dies, and the risk of flow-out of the material along the journal die parting surfaces and the like is low. In the production method according to the present invention, therefore, even when the axial pressing is completed at the same time as the completion of the pin decentering or after the completion of the pin decentering, a high risk of flow-out of the material can be avoided.

However, the production method according to the present embodiment is not absolutely to exclude completing the axial pressing before the completion of the pin decentering. In a case in which the pin decentering is completed before the completion of the axial pressing, the flow of the material of the intermediate preform 24 during the pin decentering is less suppressed. Accordingly, the final preform 25 obtained in that case is unlikely to have a material deficiency in the pin shoulders of the rough pins 25p (see FIG. 3D), and the final preform 25 is likely to have accurate shapes in the portions around the rough pins 25p. In this case, therefore, the portions around the pin shoulders of the final preform have shapes more similar to the shapes of those portions of the finish-forged product, and the final preform can be set more steadily in the dies for finish forging.

Figure 12A:
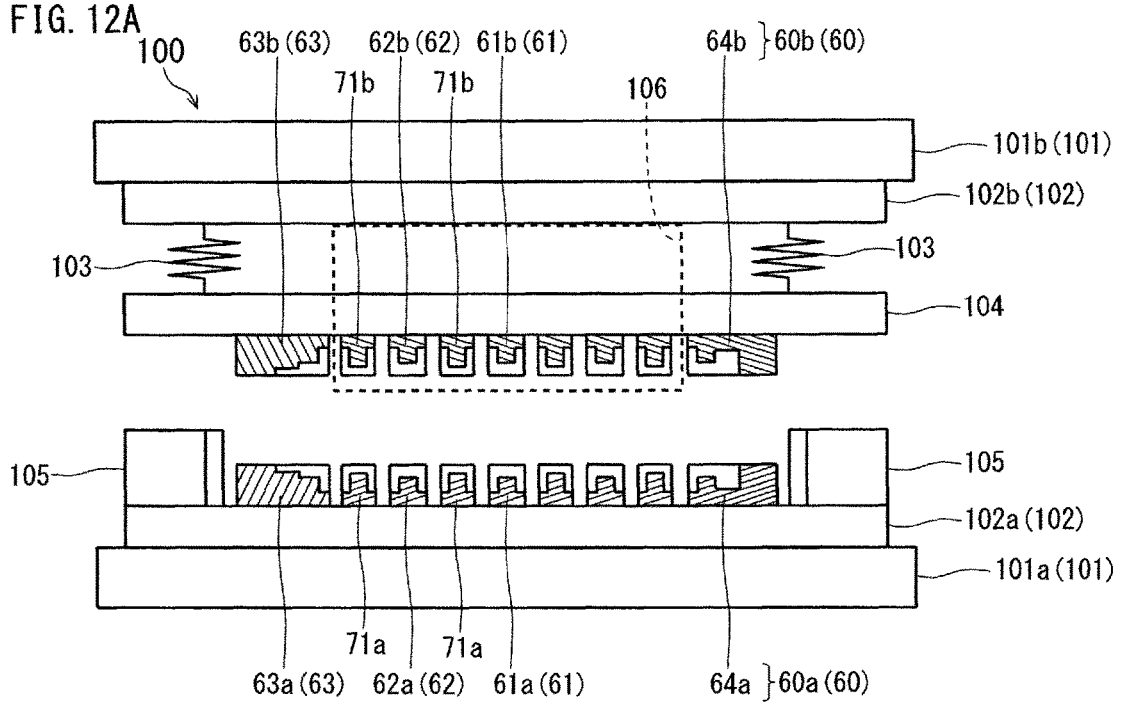
FIG. 12A is a longitudinal sectional view to schematically show a forming apparatus in a state before the start of the forming process.
Figure 13A:
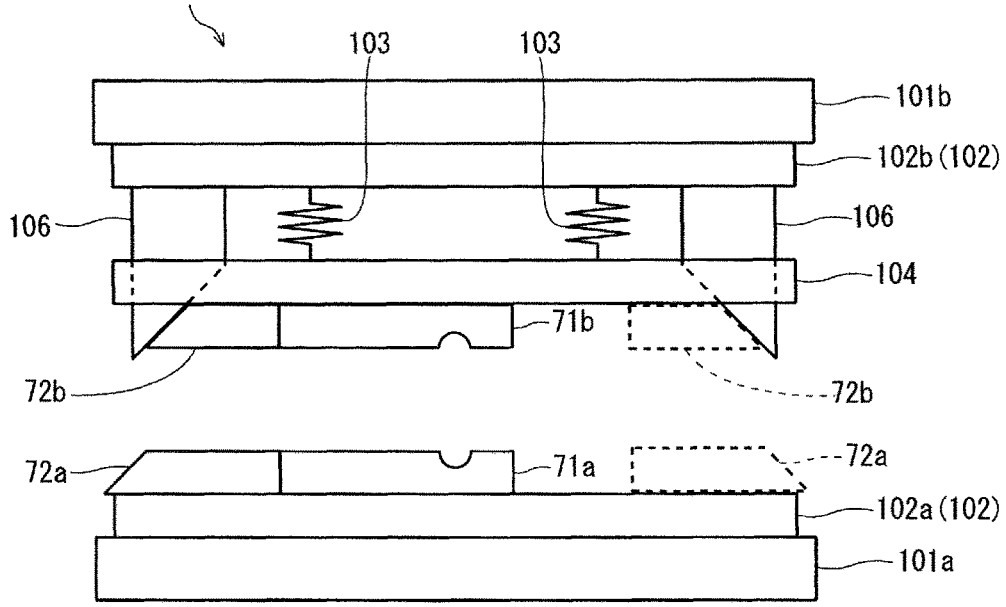
FIG. 13A is a cross sectional view to schematically show the forming apparatus in the state before the start of the forming process.

FIGS. 12A and 13A schematically show an exemplary forming apparatus 100 which is used for the forming process. In order to facilitate understanding, the parts of the apparatus which are not relevant to the description below are not drawn or drawn only simply, and the apparatus is not hatched. FIG. 12A shows a vertical longitudinal section along the axis of the intermediate preform 24. FIG. 13A shows a vertical cross section perpendicular to the axis of the intermediate preform 24 at a portion where a pair of pin decentering dies 71 is located. FIGS. 12A and 13A show a state before the start of the forming process.

The forming apparatus 100 includes a plate (forming apparatus body) 101, a bolster base 102, die cushion cylinders (extension and contraction mechanism) 103, a die cushion base 104, hydraulic cylinders (horizontal cylinders) 105, and pin decentering wedges 106. The plate 101 includes a lower plate 101a and an upper plate 101b. The bolster base 102 includes a lower bolster base 102a and an upper bolster base 102b (base).

The bolster base 102 is supported by the plate 101. The die cushion base 104 is supported by the bolster base 102b via the die cushion cylinders 103. The die cushion cylinders 103 are cylinders which are not contracted merely by the load required for pressing and holding of the rough journals but are contracted by the whole load from the plate 101.

The hydraulic cylinders 105 are cylinders to press the intermediate preform 24 in the axial direction. The forming apparatus 100 shown in FIG. 12A has two such hydraulic cylinders 105, and specifically, one by the side of the rough front part 24fr and one by the side of the rough flange part 24fl. Both ends of the intermediate preform 24 are pressed by these two hydraulic cylinders 105, and thereby, the intermediate preform 24 is pressed in the axial direction.

The lower holding dies 60a and the lower pin decentering dies 71a are arranged on the bolster base 102a. The upper holding dies 60b and the upper pin decentering dies 71b are supported by the die cushion base 104. For example, these upper dies are suspended by fasteners (L-shaped fasteners) projecting from the die cushion base 104. Among the pairs of holding dies 60, the pairs of movable dies 62, the pair of front-side holding dies 63 and the pair of flange-side holding dies 64 are movable in the axial direction of the preform.

In reference to FIG. 13A, the pin decentering wedges 106 penetrate through the die cushion base 104, and the wedges 106 are movable independently from the die cushion base 104. Each of the wedges 106 has an inclined surface. The wedges 106 are fixed on the bolster base 102b. The plate 101*b* is a plate to push the holding dies 60*b* via the die cushion cylinders (expansion and contraction mechanism) 103.

An end of each of the pin decentering dies 71*a* is connected with a wedge receiver 72*a*. More specifically, an end of each pin decentering die 71*a* is connected with the wedge receiver 72*a* such that the pin decentering die 71*a* is movable in the axial direction of the intermediate preform 24 relative to the wedge receiver 72*a* (see FIGS. 7A and 7B). As shown in FIG. 13A, the wedge receiver 72*a* has an inclined surface facing the inclined surface of the wedge 106. Similarly, an end of each of the pin decentering dies 71*b* is connected with a wedge receiver 72*b*. More specifically, an end of each pin decentering die 71*b* is connected with the wedge receiver 72*b* such that the pin decentering die 71*b* is movable in the axial direction of the intermediate preform 24 relative to the wedge receiver 72*b*. The wedge receiver 72*b* has an inclined surface facing the inclined surface of the wedge 106.

The wedge receivers 72*a* and 72*b* are movable only in the pin decentering directions. On the other hand, the pin decentering dies 71*a* are movable in the axial direction of the intermediate preform as well as in the pin decentering directions. Similarly, the pin decentering dies 71*b* are movable in the axial direction of the intermediate preform as well as in the pin decentering directions. Since the pin decentering dies 71 are movable in the axial direction of the intermediate preform, the wedge receiver 72*a* (and the wedge receiver 72*b*), as shown in FIG. 7A, has a shape extending in the axial direction of the intermediate preform.

When the forming apparatus 100 is in the state shown in FIGS. 12A and 13A, the intermediate preform 24 is placed between the lower dies and the upper dies. In this regard, the intermediate preform 24 is placed such that the decentering directions in which the rough pins 24*p* are to be decentered are parallel to the horizontal direction. This placement facilitates even mass distribution in the horizontal direction and thereby permits mass balance in the horizontal direction. This results in steady positioning of the intermediate preform 24, which reduces the risk of faulty forming during the forming process.

In the forming process, the plate 101 is moved down to hold the rough journals 24*j* and to perform the pin decentering. In the forming process, the hydraulic cylinders 105 are driven to perform the axial pressing.

Figure 12B:
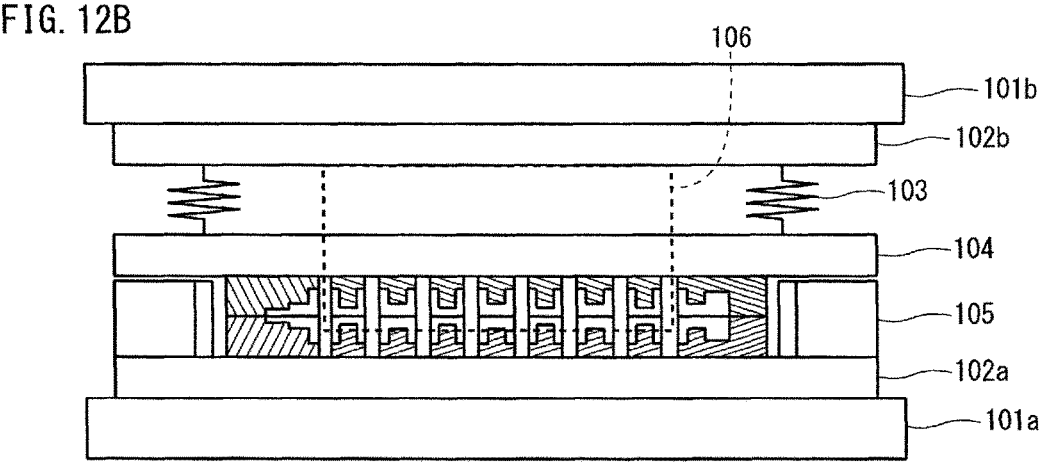
FIG. 12B is a longitudinal sectional view to schematically show the forming apparatus in a state in the middle of the forming process.
Figure 13B:
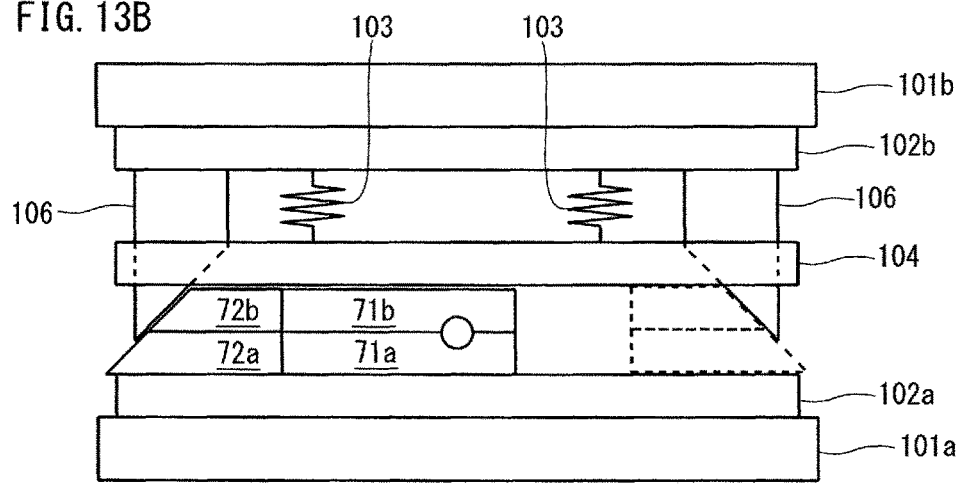
FIG. 13B is a cross sectional view to schematically show the forming apparatus in the state in the middle of the forming process.

In reference to FIG. 12A, as the plate 101*b* is moved down, the bolster base 102*b* and the upper dies supported thereby are moved down in the vertical direction. The holding dies 60*b* are moved down until they come into contact with the holding dies 60*a*, and thereby, the rough journals 24*j* are pressed and held in the holding dies 60. The state in the middle of the forming process is shown in FIGS. 12B and 13B. FIGS. 12B and 13B are sectional views at the same portion shown in FIGS. 12A and 13A.

As the plate 101*b* is moved further down with the holding dies 60*a* and 60*b* kept in contact with each other, the die cushion cylinders 103 are contracted. The die cushion cylinders 103 are cylinders which are contracted by the load from the plate 101*b*. Since the die cushion cylinders 103 are contractable, it is possible to move down the pin decentering wedges 106 continuously without changing the position of the die cushion base 104.

In reference to FIG. 13B, as the wedges 106 are moved down, the inclined surfaces of the wedges 106 push the inclined surfaces of the wedge receivers 72*a* and 72*b*, respectively. As a result, the wedge receivers 72*a* and 72*b* move in the pin decentering directions, and accordingly, the pin decentering dies 71*a* and 71*b* move in the pin decentering directions.

In reference to FIG. 12B, the two hydraulic cylinders 105 push the pair of front-side holding dies 63 and the pair of flange-side holding dies 64, respectively, so as to cause the pair of dies 63 and the pair of dies 64 to come closer to each other. With this motion, the pairs of movable holding dies 62 and the pairs of pin decentering dies 71 are moved in the axial direction of the intermediate preform to come closer to the pair of stationary holding dies 61 at the center. Thus, the pin decentering dies 71 are moved in both the pressing direction by the holding dies 60 and the pin decentering directions that are perpendicular to the pressing direction by the holding dies 60 and the axial direction of the intermediate preform.

Figure 12C:
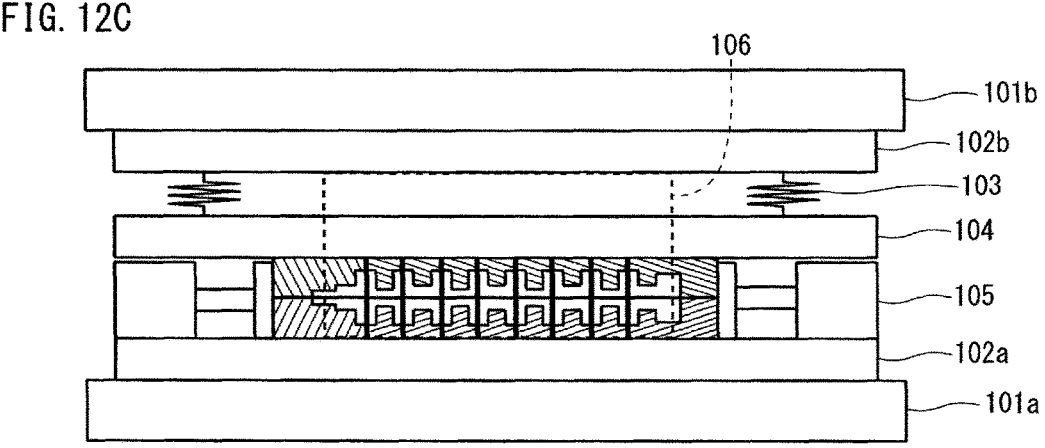
FIG. 12C is a longitudinal sectional view to schematically show the forming apparatus in a state at the completion of the forming process.
Figure 13C:
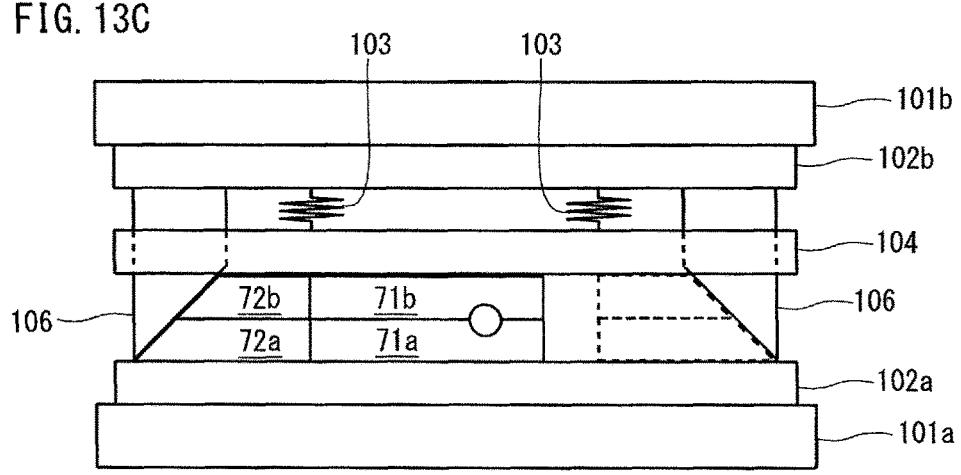
FIG. 13C is a cross sectional view to schematically show the forming apparatus in the state at the completion of the forming process.

The state of the forming apparatus 100 at the completion of the forming process is shown in FIGS. 12C and 13C. FIGS. 12C and 13C are sectional views at the same portion shown in FIGS. 12A and 13A.

In the state shown in FIGS. 12C and 13C, the downward movement of the wedges 106 and the decentering of the rough pins 24*p* thereby have been completed. Also, the axial pressing of the intermediate preform 24 by the hydraulic cylinders 105 has been completed. In this state, each of the dies (dies composing the holding dies 60 and the pin decentering dies 71) is in contact with the die(s) adjacent thereto in the axial direction of the final preform 25.

When the pin decentering directions are vertical, a mechanism for the pin decentering needs to be arranged above or below the dies. In this case, the height of the apparatus will be greater. In the production method according to the present embodiment, however, since the pin decentering directions are horizontal, this problem can be avoided. In the production method according to the present embodiment, therefore, it is possible to use a low and compact apparatus for the forming process.

Figure 14:
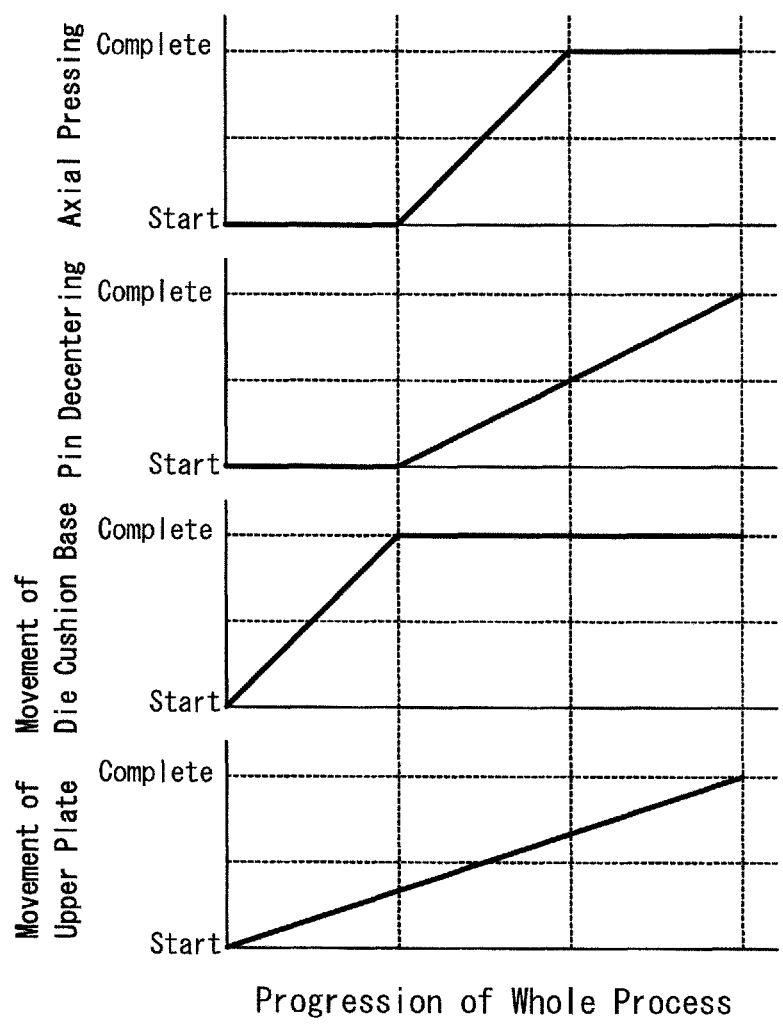
FIG. 14 is a graph to show movements of various parts of the forming apparatus during the forming process.

FIG. 14 is a diagram showing exemplary timing of the movement of the upper plate 101*b*, the movement of the die cushion base 104, the pin decentering, and the axial pressing. The horizontal axis indicates progression (time course) of the whole process. FIG. 14 shows a case in which the pin decentering and the axial pressing are started at the same time and in which the axial pressing is completed before the completion of the pin decentering. The timing of the start and completion of the pin decentering is adjustable by changing the shapes of the wedges 106 and the wedge receivers 72*a* and 72*b*, and the like. Alternatively, the pin decentering dies 71 may be moved by hydraulic cylinders or other actuators. In this case, it is possible to set the timing of the movement of the pin decentering dies 71 freely and independently from the timing of the other processes. Accordingly, the design of the forming process becomes more flexible, which permits forming of a final preform 25 of a higher quality.

In this way, the final preform 25 (see FIG. 3D) is formed. The shapes of the rough journals 25*j*, the rough pins 25*p* and the secondary rough arms 25*a* of the final preform 25 are more similar to the shapes of the journals J, the pins P and the arms A of the final product than the shapes of those parts of the intermediate preform 24 are.

4. Exemplary Finish Forging Process

In the finish forging process, the final preform 25 is pressed by a pair of pressing dies in a direction perpendicular to the decentering directions of the rough pins 25*p* and the axial direction of the final preform 25. By this pressing, a finish-forged product 26 (see FIG. 3E) including a plurality of journals J, a plurality of pins P, and a plurality of crankarms A is formed. The finish forging process can be performed by a conventional apparatus. In this case, conventional pressing dies can be used.

In the production method according to the present embodiment, the direction of placement of the final preform 25 for the finish forging process is the same as the direction of placement of the intermediate preform 24 and the final preform 25 during the forming process. Specifically, both in the forming process and the finish forging process, the intermediate preform or the final preform is subjected to the process while the preform is placed such that the decentering directions of the rough pins are parallel to the horizontal direction. Therefore, even when flash is formed along the die parting surfaces of the holding dies in the forming process, it is possible to reduce the risk that the flash may cause seams in the die forging process.

INDUSTRIAL APPLICABILITY

The present invention is applicable to production of a forged crankshaft.

LIST OF REFERENCE SYMBOLS

21: forged crankshaft
22: billet
24: intermediate preform
25: final preform
26: finish-forged product
60: holding dies
71: pin decentering dies
A, A1 to A8: crankarm
B: flash
J, J1 to J5: journal
P, P1 to P4: pin
Fr: front part
Fl: flange part
W, W1 to W8: counterweight

The invention claimed is:

1. A production method of a forged crankshaft including: a plurality of journals defining an axis of rotation; a plurality of pins decentered with respect to the journals; and a plurality of crankarms that connect the journals with the pins, respectively, wherein at least one of the crankarms includes a counterweight, the production method comprising:
   a preforming process for forming an intermediate preform from a billet, the intermediate preform including a plurality of rough journals to be formed into the plurality of journals, a plurality of rough pins to be formed into the plurality of pins, and a plurality of primary rough crankarms to be formed into the plurality of crankarms;
   a forming process for forming a final preform by, while holding and vertically pressing each of the plurality of rough journals of the intermediate preform by a pair of holding dies, decentering the rough pins in directions perpendicular to a pressing direction by the holding dies and an axial direction of the intermediate preform and pressing the intermediate preform in the axial direction of the intermediate preform, the final preform including a plurality of secondary rough crankarms of which shapes are more similar to shapes of the crankarms than shapes of the primary rough crankarms are; and
   a finish forging process for forming a finish-forged product by placing the final preform such that the directions in which the rough pins are decentered are parallel to a horizontal direction and pressing the thus placed final preform vertically by a pair of pressing dies, the finish-forged product including the plurality of journals, the plurality of pins and the plurality of crankarms.

2. The production method according to claim 1, wherein in the forming process, material is caused to flow out along horizontally extended die parting surfaces of the holding dies, so that the final preform includes flash.

3. The production method according to claim 1, wherein in the forming process, the pressing of the intermediate preform in the axial direction thereof is completed after the decentering of the rough pins is completed.

4. The production method according to claim 1, wherein in the forming process, the pressing of the intermediate preform in the axial direction thereof is completed before the decentering of the rough pins is completed.

5. The production method according to claim 1, wherein in the forming process, the pressing of the intermediate preform in the axial direction thereof is completed at a time when the decentering of the rough pins is completed.

6. The production method according to claim 1, wherein:
   in the forming process, the pressing of the intermediate preform in the axial direction thereof is performed by a hydraulic cylinder; and
   in the forming process, the decentering of the rough pins is performed by a wedge fixed on a base which pushes the holding dies via an extension and contraction mechanism.

7. The production method according to claim 2, wherein in the forming process, the pressing of the intermediate preform in the axial direction thereof is completed after the decentering of the rough pins is completed.

8. The production method according to claim 2, wherein in the forming process, the pressing of the intermediate preform in the axial direction thereof is completed before the decentering of the rough pins is completed.

9. The production method according to claim 2, wherein in the forming process, the pressing of the intermediate preform in the axial direction thereof is completed at a time when the decentering of the rough pins is completed.

10. The production method according to claim 2, wherein:
    in the forming process, the pressing of the intermediate preform in the axial direction thereof is performed by a hydraulic cylinder; and
    in the forming process, the decentering of the rough pins is performed by a wedge fixed on a base which pushes the holding dies via an extension and contraction mechanism.

11. The production method according to claim 3, wherein:
    in the forming process, the pressing of the intermediate preform in the axial direction thereof is performed by a hydraulic cylinder; and
    in the forming process, the decentering of the rough pins is performed by a wedge fixed on a base which pushes the holding dies via an extension and contraction mechanism.

12. The production method according to claim 4, wherein:
    in the forming process, the pressing of the intermediate preform in the axial direction thereof is performed by a hydraulic cylinder; and in the forming process, the decentering of the rough pins is performed by a wedge fixed on a base which pushes the holding dies via an extension and contraction mechanism.

13. The production method according to claim 5, wherein:

in the forming process, the pressing of the intermediate preform in the axial direction thereof is performed by a hydraulic cylinder; and in the forming process, the decentering of the rough pins is performed by a wedge fixed on a base which pushes the holding dies via an extension and contraction mechanism.

14. The production method according to claim 7, wherein:

in the forming process, the pressing of the intermediate preform in the axial direction thereof is performed by a hydraulic cylinder; and in the forming process, the decentering of the rough pins is performed by a wedge fixed on a base which pushes the holding dies via an extension and contraction mechanism.

15. The production method according to claim 8, wherein:

in the forming process, the pressing of the intermediate preform in the axial direction thereof is performed by a hydraulic cylinder; and in the forming process, the decentering of the rough pins is performed by a wedge fixed on a base which pushes the holding dies via an extension and contraction mechanism.

16. The production method according to claim 9, wherein:

in the forming process, the pressing of the intermediate preform in the axial direction thereof is performed by a hydraulic cylinder; and in the forming process, the decentering of the rough pins is performed by a wedge fixed on a base which pushes the holding dies via an extension and contraction mechanism.

\* \* \* \* \*